US012767558B2

(12) United States Patent
Yong et al.

(10) Patent No.: US 12,767,558 B2
(45) Date of Patent: Oct. 20, 2026

(54) COLD-WATER MAKING APPARATUS AND WATER PURIFIER COMPRISING SAME

(71) Applicant: COWAY Co., Ltd., Gongju-si (KR)

(72) Inventors: Min Chul Yong, Gongju-si (KR); Chung Rae Kim, Gongju-si (KR); Chul Ho Kim, Gongju-si (KR); Chan Jung Park, Gongju-si (KR)

(73) Assignee: COWAY Co., Ltd., Gongju-si (KR)

( * ) Notice: Subject to any disclaimer, the term of this patent is extended or adjusted under 35 U.S.C. 154(b) by 599 days.

(21) Appl. No.: 18/044,617

(22) PCT Filed: Sep. 9, 2021

(86) PCT No.: PCT/KR2021/012306
§ 371 (c)(1),
(2) Date: Mar. 9, 2023

(87) PCT Pub. No.: WO2022/055283
PCT Pub. Date: Mar. 17, 2022

(65) Prior Publication Data

US 2023/0373816 A1    Nov. 23, 2023

(30) Foreign Application Priority Data

Sep. 10, 2020 (KR) ........................ 10-2020-0116169

(51) Int. Cl.
*C02F 1/00* (2023.01)

(52) U.S. Cl.
CPC ........ *C02F 1/001* (2013.01); *C02F 2201/005* (2013.01); *C02F 2209/02* (2013.01)

(58) Field of Classification Search
CPC .......... C02F 1/001; C02F 1/006; C02F 1/283; C02F 1/44; C02F 1/4691; C02F 1/4695;
(Continued)

(56) References Cited

U.S. PATENT DOCUMENTS

| | | | | |
|---|---|---|---|---|
| 4,971,137 | A | 11/1990 | Thompson | |
| 5,493,864 | A * | 2/1996 | Pomerene .............. | H10N 10/13 62/391 |

(Continued)

FOREIGN PATENT DOCUMENTS

| | | | |
|---|---|---|---|
| CN | 201672677 | U | 12/2010 |
| CN | 206228210 | U | 6/2017 |

(Continued)

OTHER PUBLICATIONS

KR 20160139871 A English description, Dec. 7, 2016, Kim Do Hyun.*

(Continued)

*Primary Examiner* — Akash K Varma
(74) *Attorney, Agent, or Firm* — Oblon, McClelland, Maier & Neustadt, L.L.P.

(57) ABSTRACT

The present invention relates to an apparatus for making cold water and a water purifier including the same, and more specifically to an apparatus for making cold water which is configured such that any one of a water inlet port, which is in communication with a water inlet flow path member so that incoming water can be introduced into a case member, and a water outlet port, which is in communication with a water outlet flow path member so that outflowing water can be discharged, is arranged adjacent to a heat transfer wall of the case member, and thus, storage water in the case member flows while directly contacting the inner surface of the heat transfer wall, and thus, the cooling performance of the apparatus for making cold water can be improved, and at the same time, the storage water may sufficiently flow without remaining in the case member, thereby improving the cleanliness of the outflowing water, and a water purifier including the same.

9 Claims, 11 Drawing Sheets

(58) Field of Classification Search

CPC ........ C02F 1/00; C02F 9/20; C02F 2201/005; C02F 2209/02; C02F 2301/028; C02F 2307/10; B01D 35/00; B01D 35/18; H10N 10/13; E03F 5/22; F24F 5/00; F28F 9/0265; F28F 27/02; F28F 3/12; F25B 2321/02; F25B 21/02; F25B 21/04; F25D 23/126; F25D 29/00; F25D 11/00; F25D 19/00; F25D 31/002; F25D 31/00; B67D 1/0869; B67D 1/0857; B67D 1/0014; B67D 1/00; B67D 1/08; B67D 2210/0001; B67D 3/00

USPC ........................................................ 210/150

See application file for complete search history.

(56) References Cited

U.S. PATENT DOCUMENTS

| | | | | |
|---|---|---|---|---|
| 10,464,802 | B2 | 11/2019 | Jung et al. | |
| 2009/0193834 | A1 * | 8/2009 | Buchstab | F25D 23/126<br>165/181 |
| 2018/0099854 | A1 * | 4/2018 | Jung | C02F 9/20 |

FOREIGN PATENT DOCUMENTS

| | | | | | |
|---|---|---|---|---|---|
| CN | 107917564 | A | | 4/2018 | |
| EP | 3404154 | A1 | * | 11/2018 | E03F 5/22 |
| EP | 3 674 630 | A1 | | 7/2020 | |
| JP | 2008-215249 | A | | 9/2006 | |
| JP | 2012-229912 | A | | 11/2012 | |
| KR | 10-2010-0018635 | A | | 2/2010 | |
| KR | 10-2013-0141200 | A | | 12/2013 | |
| KR | 10-2015-0016463 | A | | 2/2015 | |
| KR | 10-2016-0139871 | A | | 12/2016 | |
| KR | 20160139871 | A | * | 12/2016 | B01D 35/00 |
| KR | 10-2017-0061301 | A | | 6/2017 | |
| KR | 10-2018-0005506 | A | | 1/2018 | |
| KR | 10-2018-0039987 | A | | 4/2018 | |
| KR | 10-2018-0117526 | A | | 10/2018 | |

OTHER PUBLICATIONS

Extended European Search Report issued Jul. 17, 2024, in corresponding European Patent Application No. 21867148.5, 10 pages.

Office Action issued Jul. 30, 2024, in corresponding Japanese Patent Application No. 2023-513190, 7 pages.

International Search Report mailed on Dec. 17, 2021 in PCT/KR2021/012306 filed on Sep. 9, 2021.

Combined Chinese Office Action and Search Report issued Aug. 29, 2025, in corresponding Chinese Patent Application No. 202180062046.4 (with English Translation of Category of Cited Documents), 9 pages.

Notice of Allowance issued in CN 202180062046.4 on Jun. 30, 2026, citing documents 1-6 therein.

* cited by examiner (a)

(b)

COLD-WATER MAKING APPARATUS AND WATER PURIFIER COMPRISING SAME

CROSS-REFERENCE TO RELATED APPLICATION

This application claims priority to and the benefit of Korean Patent Application No. 10-2020-0116169, filed on Sep. 10, 2020, the disclosure of which is incorporated herein by reference in its entirety.

TECHNICAL FIELD

The present invention relates to an apparatus for making cold water and a water purifier including the same, and more specifically to an apparatus for making cold water which is configured such that any one of a water inlet port, which is in communication with a water inlet flow path member so that incoming water can be introduced into a case member, and a water outlet port, which is in communication with a water outlet flow path member so that outflowing water can be discharged, is arranged adjacent to a heat transfer wall of the case member, and thus, storage water in the case member flows while directly contacting the inner surface of the heat transfer wall, and thus, the cooling performance of the apparatus for making cold water can be improved, and at the same time, the storage water may sufficiently flow without remaining in the case member, thereby improving the cleanliness of the outflowing water, and a water purifier including the same.

BACKGROUND ART

In general, an apparatus for making cold water is an apparatus for cooling water which is supplied from a faucet or bottled water and providing the same to a user. Such an apparatus for making cold water is mainly installed to generate low-temperature drinking water, such as a water purifier, a carbonated water machine, a cold/hot water machine and the like, and it may be used in various fields requiring the generation of cold water.

European Patent Application No. 3674630 by Coway Co., Ltd. discloses a conventional water purifier. The water purifier is provided with an internal space formed therein, a tank body having a water inlet port and a water outlet port formed therein, a thermoelectric module for cooling water which is accommodated in the tank body and a cold sink for transferring cold air from the thermoelectric module to the tank body. In this case, the water inlet port is formed on the upper side of the tank body, the water outlet port is formed on the lower side of the tank body, and the water flowing into the upper side of the tank body is configured to be cooled while flowing to the lower side of the tank body, and if it is configured in this way so that the water is input to the upper side of the tank body and then cooled and discharged to the lower side, there are problems in that the air introduced with water remains inside the tank body, and the cooling performance of the water accommodated inside the tank body is deteriorated due to the remaining air. In order to solve these problems, a separate check valve for discharging air is provided to discharge the air remaining in the upper part of the tank body, but there is still a problem in that the cooling performance is deteriorated, such as a decrease in the force to push out the water accommodated in the tank body, because this check valve is disposed on the upper part of the tank body, and the incoming water escapes through the check valve.

The apparatus for making cold water disclosed in U.S. Patent Application Publication No. 2018-0099854 by LG Electronics Inc. is provided with a tank having a water inlet port and a water outlet port, a cooling module for cooling the purified water which is input into the tank, and an internal flow path unit which is formed inside the tank to guide the purified water from the water inlet port to the water outlet port. Part of the purified water which is input into the tank is phase-changed into ice by the cooling module and remains in the internal flow path unit, and the remaining part of the purified water passes through the internal flow path unit and is cooled through contacting with ice and is discharged to the water outlet port, and when ice is formed inside the tank in this way, there are problems in that the purified water cannot exchange heat directly with the cooling module, which reduces the cooling performance of the purified water, and as the volume through which purified water can flow is reduced due to the ice inside the tank, the amount of cold water discharged is reduced. In addition, when ice is formed inside the tank for a long period of time, there is also a problem in that the cleanliness of the purified water is reduced due to this ice. Furthermore, the purified water entering the tank is input in a direction toward the wall on which the cooling module is installed, and since ice is formed on the wall on which the cooling module is installed, there is a problem in that as vortexes are formed while purified water collides with the ice, purified water cannot flow smoothly.

(Patent Document 1) European Patent Application No. 3674630

(Patent Document 2) US Patent Application Publication No. 2018-0099854

DISCLOSURE

Technical Problem

In order to solve the above problems, the apparatus for making cold water according to the present invention is configured such that any one of the water inlet port, which is in communication with the water inlet flow path member such that the incoming water flows into the inside of the case member, and the water outlet port, which is in communication with the water outlet flow path member such that the outflowing water flows out, is disposed adjacent to the heat transfer wall of the case member and the storage water inside the case member flows while directly contacting the inner surface of the heat transfer wall, and thus, it is directed to improving the cooling performance of the apparatus for making cold water and improving the cleanliness of the outflowing water because the storage water does not remain inside the case member and can flow smoothly.

In the apparatus for making cold water according to an exemplary embodiment of the present invention, since the flow direction of the incoming water which flows in through the water inlet port and the flow direction of the outflowing water which flows out through the water outlet port are formed to be the same as the flow direction of the storage water which flows through a plurality of zones inside the case member, the vortex generation is suppressed and the incoming water is configured to smoothly push out the storage water, and thus, it is directed to improving the cooling performance and cleanliness.

In the apparatus for making cold water according to an exemplary embodiment of the present invention, diaphragms which form a plurality of zones inside the case member are integrally formed with a heat transfer wall and configured such that the storage water flows while directly contacting the inner surface of the heat transfer wall, and thus, it is directed to improving the cooling performance.

In the apparatus for making cold water according to an exemplary embodiment of the present invention, while an upper wall, a lower wall and a pair of side walls are integrally formed to extend on the heat transfer wall, an inclined surface which is formed to extend upward in a direction toward the opposite wall on the inner surface of the upper wall such that the air inside the case member is guided along the inclined surface along the flow of storage water and does not remain inside the case member, and thus, it is directed to improving cooling performance and improving manufacturability when the above configurations are integrally manufactured using a mold or the like such that it is possible to easily remove a mold frame.

The apparatus for making cold water according to an exemplary embodiment of the present invention is configured such that the water outlet port is disposed adjacent to the opposite wall so that the air guided along the inclined surface is discharged together with the outflowing water, and thus, it is directed to improving user convenience by increasing the amount of incoming water and the amount of outflowing water.

In the apparatus for making cold water according to an exemplary embodiment of the present invention, a reduction surface with an expanded inner diameter is formed on the inner peripheral surface of the water inlet port to reduce the flow rate of incoming water which flows into the case member at a certain level or below, and thus, it is directed to improving cooling performance through a first-in-first-out structure in which the incoming water pushes out the storage water.

In the apparatus for making cold water according to an exemplary embodiment of the present invention, a resistance baffle for partially closing the flow path of the incoming water is provided inside the case member such that the flow rate of the incoming water which flows into the case member is reduced to a certain level or below, and thus, it is directed to improving cooling performance through a first-in-first-out structure in which the incoming water pushes out the storage water.

In the apparatus for making cold water according to an exemplary embodiment of the present invention, the interval between the diaphragms which form a plurality of zones inside the case member is formed to a certain level or below, and thus, it is directed to improving cooling performance through a first-in-first-out structure in which the incoming water pushes out the storage water.

In the apparatus for making cold water according to an exemplary embodiment of the present invention, openings through which the storage water flows are alternately formed at corners and opposite corners of the diaphragms which are continuously disposed upward inside the case member and are configured such that the storage water flows in a diagonal direction inside the case member, and thus, it is directed to improving cooling performance.

The water purifier according to the present invention generates purified water by filtering raw water, and generates cold water by supplying the generated purified water, and the cold water generating unit is configured such that any one of the water inlet port, which is in communication with the water inlet flow path member such that incoming water flows into the inside of the case member, and the water outlet port, which is in communication with the water outlet flow path member such that outflowing water flows out, is disposed adjacent to the heat transfer wall of the case member such that the storage water inside the case member flows while directly contacting the inner surface of the heat transfer wall, and thus, it is directed to improving the cooling performance of the cold water generating device, and improving the cleanliness of outflowing water because the storage water does not remain inside the case member and can flow smoothly.

Technical Solution

In order to achieve the above objects, the apparatus for making cold water according to the present invention includes a case member in which storage water is accommodated; a water inlet flow path member for providing a flow path of incoming water which flows into the case member; a water outlet flow path member for providing a flow path of outflowing water which flows out from the inside of the case member; and a cooling member which is disposed on one side of the case member to cool the storage water which is accommodated inside the case member, wherein the case member is provided with an upper wall and a lower wall which are disposed to be opposite to each other along a height direction, a pair of side walls which are disposed to be opposite to each other along a width direction, a heat transfer wall and an opposite wall which are disposed to be opposite to each other along a depth direction, diaphragms which are disposed to be parallel to the width direction so as to divide the inside of the case member into a plurality of zones, a water inlet port, which is in communication with the water inlet flow path member such that incoming water flows in, and a water outlet port, which is in communication with the water outlet flow path member such that outflowing water flows out, and wherein any one of the water inlet port and the water outlet port is disposed adjacent to the heat transfer wall along the depth direction such that the storage water inside the case member flows while directly contacting the inner surface of the heat transfer wall, and the other port is disposed adjacent to the opposite wall.

In the apparatus for making cold water according to an exemplary embodiment of the present invention, the water inlet port is provided at the lower end of any one of the pair of side walls, and the water outlet port is provided at the upper end of the other side wall, and wherein the direction of incoming water which flows in through the water inlet port and the direction of outflowing water which flows out through the water outlet port are formed to be parallel to the width direction.

In the apparatus for making cold water according to an exemplary embodiment of the present invention, in the heat transfer wall, the diaphragms are formed to integrally extend such that the storage water directly contacts the inner surface of the heat transfer wall in the process of flowing between the diaphragms.

In the apparatus for making cold water according to an exemplary embodiment of the present invention, the upper wall, the lower wall and the pair of side walls are integrally formed with the heat transfer wall, wherein the opposite wall is coupled such that the inside of the case member is closed, and wherein an inclined surface which extends upward in a direction toward the opposite wall along the depth direction is formed on the inner surface of the upper wall.

In the apparatus for making cold water according to an exemplary embodiment of the present invention, the water outlet port is disposed adjacent to the opposite wall such that the air guided along the inclined surface is discharged together with the outflowing water.

In the apparatus for making cold water according to an exemplary embodiment of the present invention, a reduction surface is formed on the inner peripheral surface of the water inlet port such that the inner diameter is expanded so that while the flow rate of incoming water which is supplied through the water inlet flow path member is reduced to a certain flow rate or less, the incoming water flows into the inside of the case member through the water inlet port.

In the apparatus for making cold water according to an exemplary embodiment of the present invention, a resistance baffle is provided inside the case member to partially close the flow path of incoming water such that while the flow rate of incoming water which is supplied through the water inlet flow path member is reduced to a certain flow rate or less, the incoming water flows into the inside of the case member.

In the apparatus for making cold water according to an exemplary embodiment of the present invention, the flow rate of storage water which flows along the plurality of zones inside the case member is 1.2 L/min or less.

In the apparatus for making cold water according to an exemplary embodiment of the present invention, when the total height inside the case member is H, the interval h between the diaphragms which are disposed to be opposite to each other is H/9 or less.

In the apparatus for making cold water according to an exemplary embodiment of the present invention, the interval between the diaphragms which are disposed to be opposite to each other is 18 mm or less.

In the apparatus for making cold water according to an exemplary embodiment of the present invention, openings through which the storage water moves are formed in the diaphragms, respectively, and wherein the openings are alternately formed at corners and opposite corners of the diaphragms that are continuously arranged upward such that the storage water which flows inside the case member flows in a diagonal direction.

The water purifier according to the present invention includes a filtering unit for generating purified water by filtering raw water; and a cold water generating unit for generating cold water by receiving purified water from the filtering unit, wherein the cold water generating unit is provided with a case member in which purified water is accommodated, a water inlet flow path member for providing a flow path through which purified water flows into the case member, a water outlet flow path member for providing a flow path through which purified water which is cooled inside the case member flows out, and a cooling member which is disposed on one side of the case member to cool the purified water which is accommodated inside the case member, wherein the case member is provided with an upper wall and a lower wall which are disposed to be opposite to each other along a height direction, a pair of side walls which are disposed to be opposite to each other along a width direction, a heat transfer wall and an opposite wall which are disposed to be opposite to each other along a depth direction, diaphragms which are disposed to be parallel to the width direction so as to divide the inside of the case member into a plurality of zones, a water inlet port, which is in communication with the water inlet flow path member such that purified water flows in, and a water outlet port, which is in communication with the water outlet flow path member such that purified water flows out, and wherein any one of the water inlet port and the water outlet port is disposed adjacent to the heat transfer wall along the depth direction such that the purified water inside the case member flows while directing contacting the inner surface of the heat transfer wall, and the other port is disposed adjacent to the opposite wall.

Advantageous Effects

According to the above configuration, in the apparatus for making cold water according to the present invention, any one of the water inlet port, which is in communication with the water inlet flow path member such that the incoming water flows into the inside of the case member, and the water outlet port, which is in communication with the water outlet flow path member such that the outflowing water flows out, is disposed adjacent to the heat transfer wall of the case member and configured such that the storage water inside the case member flows while directly contacting the inner surface of the heat transfer wall, and thus, it provides the effects of improving the cooling performance of the apparatus for making cold water and improving the cleanliness of the outflowing water because the storage water does not remain inside the case member and can flow smoothly.

In the apparatus for making cold water according to an exemplary embodiment of the present invention, since the flow direction of the incoming water which flows in through the water inlet port and the flow direction of the outflowing water which flows out through the water outlet port are formed to be the same as the flow direction of the storage water which flows through a plurality of zones inside the case member, the vortex generation is suppressed and the incoming water is configured to smoothly push out the storage water, and thus, it provides the effect of improving the cooling performance and cleanliness.

In the apparatus for making cold water according to an exemplary embodiment of the present invention, diaphragms which form a plurality of zones inside the case member are integrally formed with a heat transfer wall and configured such that the storage water flows while directly contacting the inner surface of the heat transfer wall, and thus, it provides the effect of improving the cooling performance.

In the apparatus for making cold water according to an exemplary embodiment of the present invention, while an upper wall, a lower wall and a pair of side walls are integrally formed to extend in the heat transfer wall, an inclined surface which is formed to extend upward in a direction toward the opposite wall on the inner surface of the upper wall such that the air inside the case member is guided along the inclined surface along the flow of storage water and does not remain inside the case member, and thus, it provides the effects of improving cooling performance and improving manufacturability when the above configurations are integrally manufactured using a mold or the like such that it is possible to easily remove a mold frame.

The apparatus for making cold water according to an exemplary embodiment of the present invention is configured such that the water outlet port is disposed adjacent to the opposite wall so that the air guided along the inclined surface is discharged together with the outflowing water, and thus, it provides the effect of improving user convenience by increasing the amount of incoming water and the amount of outflowing water.

In the apparatus for making cold water according to an exemplary embodiment of the present invention, a reduction surface with an expanded inner diameter is formed on the inner peripheral surface of the water inlet port to reduce the flow rate of incoming water which flows into the case member at a certain level or below, and thus, it provides the effect of improving cooling performance through a first-in-first-out structure in which the incoming water pushes out the storage water.

In the apparatus for making cold water according to an exemplary embodiment of the present invention, a resistance baffle for partially closing the flow path of the incoming water is provided inside the case member such that the flow rate of the incoming water which flows into the case member is reduced to a certain level or below, and thus, it provides the effect of improving cooling performance through a first-in-first-out structure in which the incoming water pushes out the storage water.

In the apparatus for making cold water according to an exemplary embodiment of the present invention, the interval between the diaphragms which form a plurality of zones inside the case member is formed to a certain level or below, and thus, it provides the effect of improving cooling performance through a first-in-first-out structure in which the incoming water pushes out the storage water.

In the apparatus for making cold water according to an exemplary embodiment of the present invention, openings through which the storage water flows are alternately formed at corners and opposite corners of the diaphragms which are continuously disposed upward inside the case member and are configured such that the storage water flows in a diagonal direction inside the case member, and thus, it provides the effect of improving cooling performance.

The water purifier according to the present invention generates purified water by filtering raw water, and generates cold water by supplying the generated purified water, and the cold water generating unit is configured such that any one of the water inlet port, which is in communication with the water inlet flow path member such that incoming water flows into the inside of the case member, and the water outlet port, which is in communication with the water outlet flow path member such that outflowing water flows out is disposed adjacent to the heat transfer wall of the case member such that the storage water inside the case member flows while directly contacting the inner surface of the heat transfer wall, and thus, it provides the effects of improving the cooling performance of the cold water generating device, and improving the cleanliness of outflowing water because the storage water does not remain inside the case member and can flow smoothly.

MODES OF THE INVENTION

Figure 1:
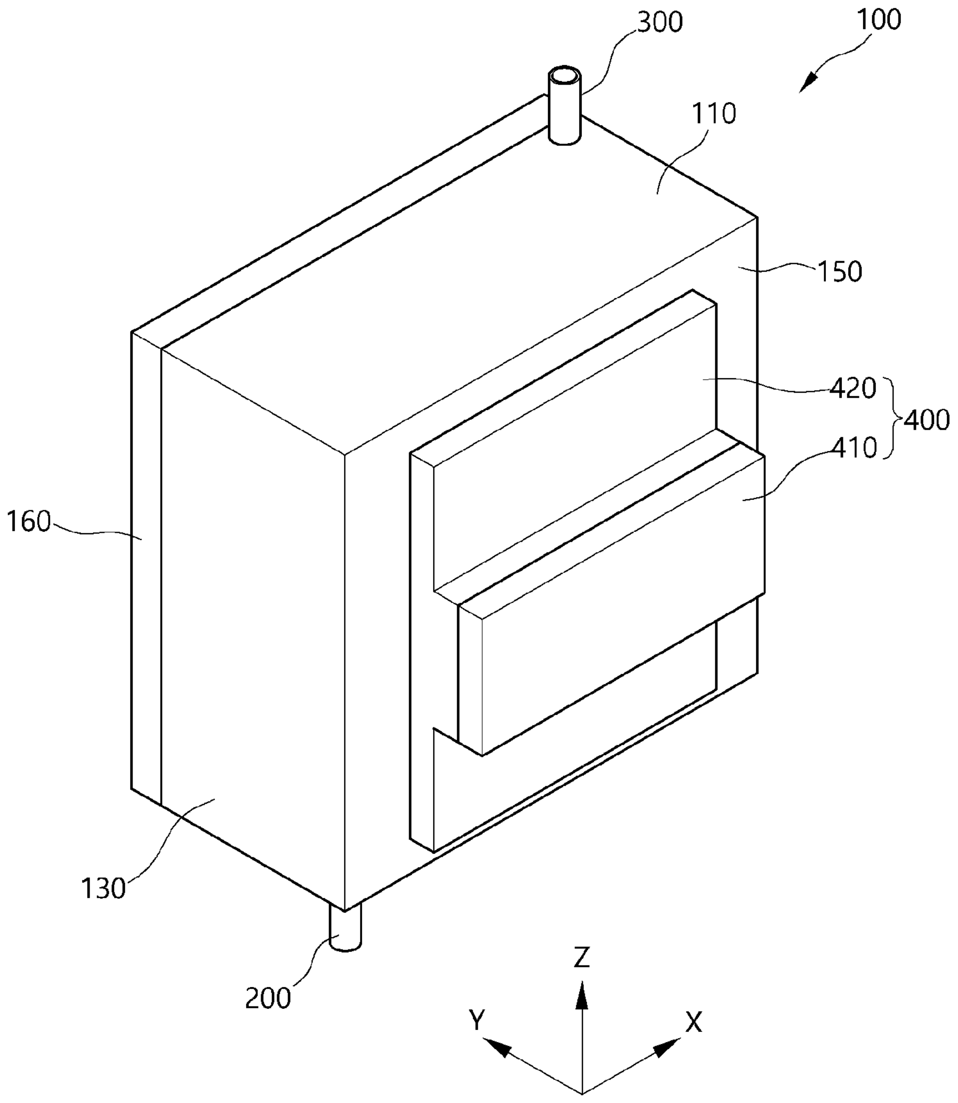
FIG. 1 is a perspective view illustrating the apparatus for making cold water according to an exemplary embodiment of the present invention.

Terms and words used in the present specification and claims should not be construed as limited to their usual or dictionary definition, and they should be interpreted as a meaning and concept consistent with the technical idea of the present invention based on the principle that inventors may appropriately define the terms and concept in order to describe their own invention in the best way Accordingly, the exemplary embodiments described in the present specification and the configurations shown in the drawings correspond to preferred exemplary embodiments of the present invention, and do not represent all the technical spirit of the present invention, and thus, the configurations may have various examples of equivalent and modification that can replace them at the time of filing the present invention.

It is understood that the terms “include” or “have”, when used in the present specification, are intended to describe the presence of stated features, integers, steps, operations, elements, components and/or a combination thereof but not preclude the possibility of the presence or addition of one or more other features, integers, steps, operations, elements, components or a combination thereof.

The presence of an element in/on “front”, “rear”, “upper or above or top” or “lower or below or bottom” of another element includes not only being disposed in/on “front”, “rear”, “upper or above or top” or “lower or below or bottom” directly in contact with other elements, but also cases in which another element being disposed in the middle, unless otherwise specified. In addition, unless otherwise specified, that an element is “connected” to another element includes not only direct connection to each other but also indirect connection to each other.

Figure 2:
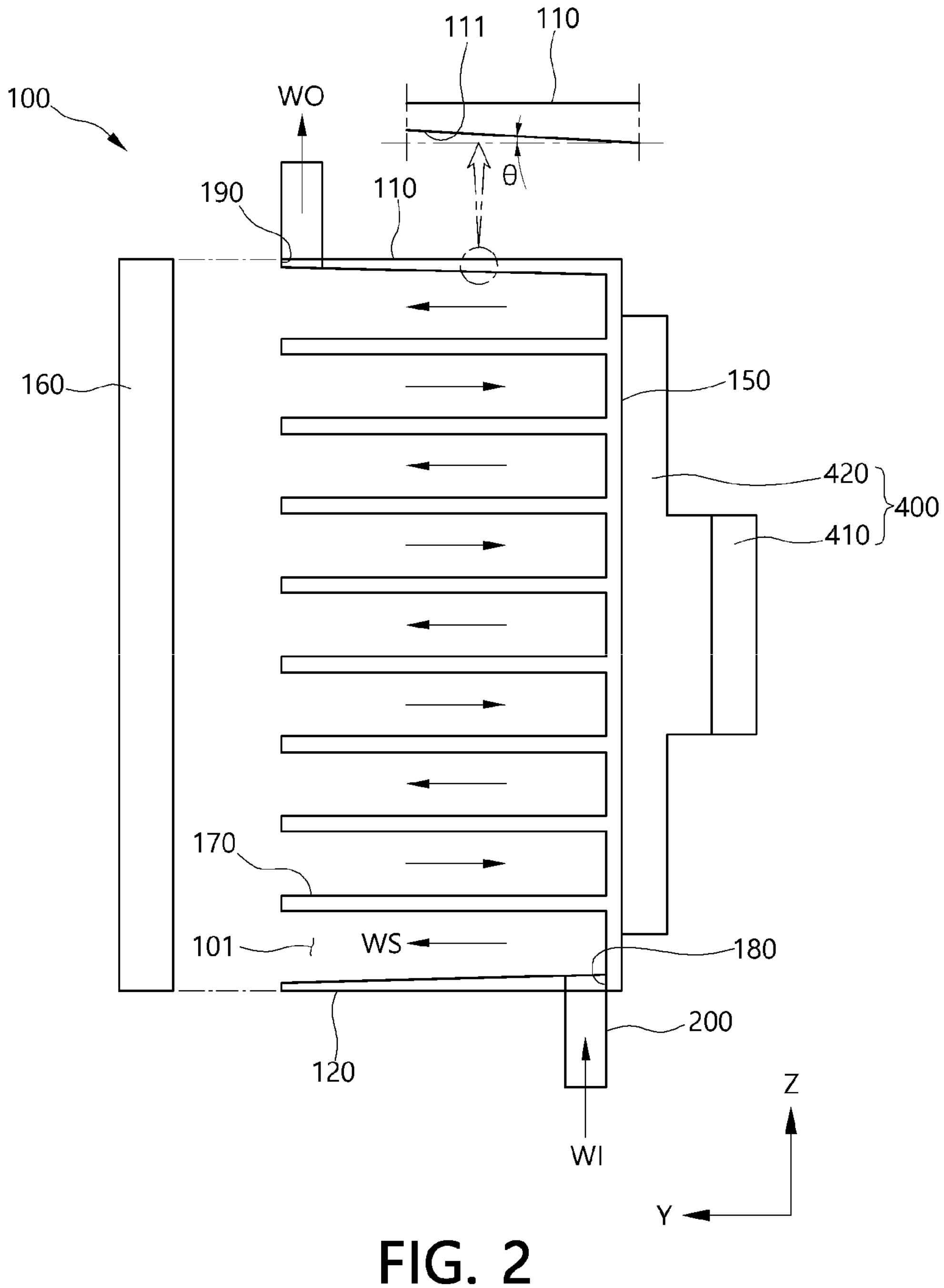
FIG. 2 is a cross-sectional view illustrating a state in which the apparatus for making cold water according to an exemplary embodiment of the present invention is cut along the depth direction.
Figure 3:
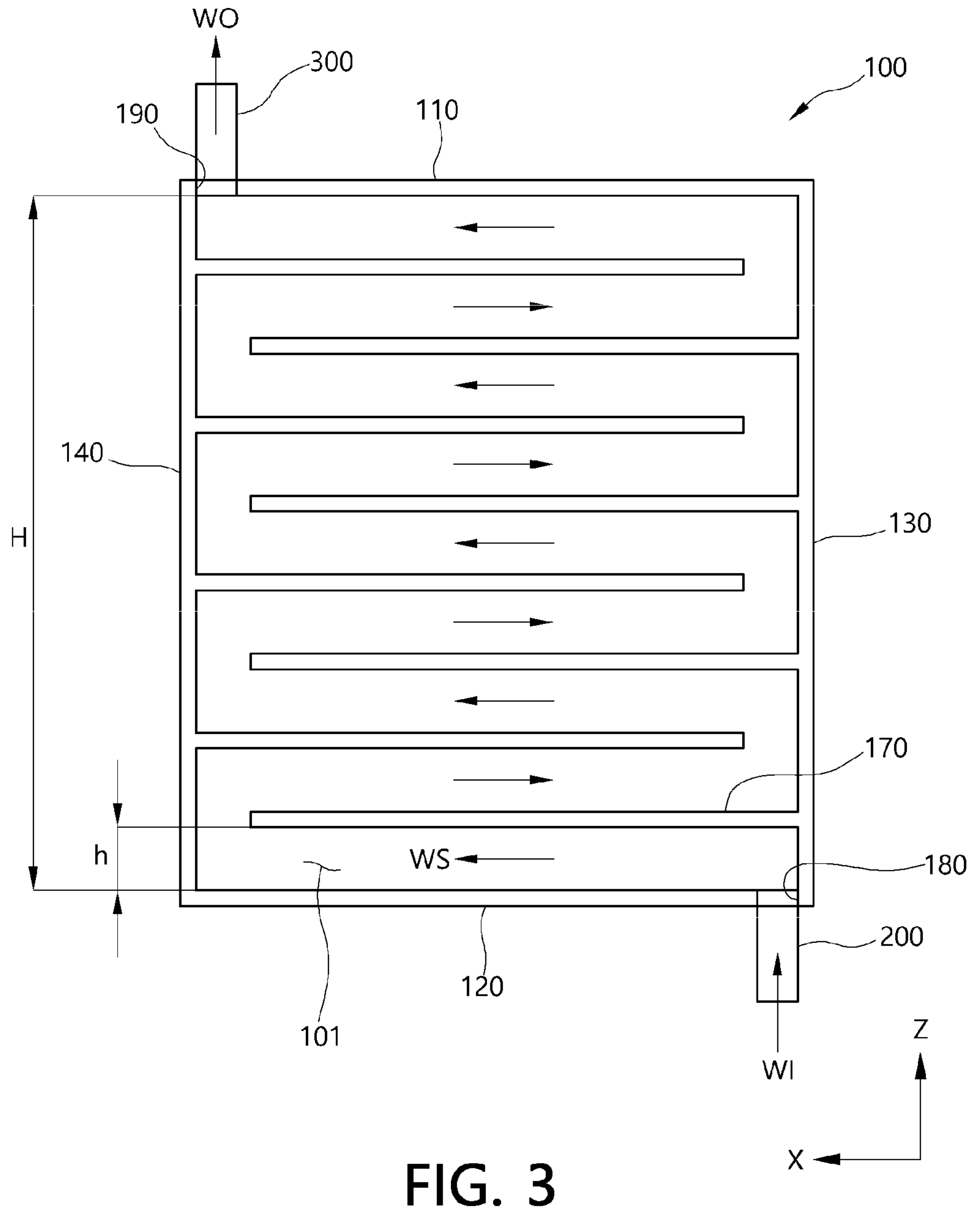
FIG. 3 is a cross-sectional view illustrating a state in which the apparatus for making cold water according to an exemplary embodiment of the present invention is cut along the width direction.

Hereinafter, the apparatus for making cold water according to the present invention will be described with reference to the drawings. FIG. 1 is a perspective view illustrating the apparatus for making cold water according to an exemplary embodiment of the present invention, FIG. 2 is a cross-sectional view illustrating a state in which the apparatus for making cold water according to an exemplary embodiment of the present invention is cut along the depth direction, and FIG. 3 is a cross-sectional view illustrating a state in which the apparatus for making cold water according to an exemplary embodiment of the present invention is cut along the width direction. Herein, the X direction means the width direction of the apparatus for making cold water, the Y direction means the depth direction of the apparatus for making cold water, and the Z direction means the height direction of the apparatus for making cold water. In order to clearly describe the present invention, parts that are not related to the description are omitted from the drawings.

As illustrated in FIG. 1, the apparatus for making cold water according to an exemplary embodiment of the present invention includes a case member 100 in which storage water WS is accommodated, a water inlet flow path member 200 for providing a flow path of incoming water WI which flows into the case member 100, a water outlet flow path member 300 for providing a flow path of outflowing water WO which flows out from the inside of the case member 100, and a cooling member 400 which is disposed on one side of the case member 100 to cool the storage water WS which is accommodated inside the case member 100.

This case member 100 provides a space for accommodating the storage water WS, and it may be formed in a hexahedral shape, but is not necessarily limited to this shape as long as a space for accommodating the storage water WS is formed. In addition, each side of the case member 100 may be formed not only in a shape which is bent at a right angle, but also in a shape which is curved to form a predetermined curvature. The water inlet flow path member 200 provides a flow path such that various types of incoming water as well as purified water flow into the case member 100, and a pipe having a predetermined diameter may be used. The water outlet flow path member 300 provides a flow path for the cooled outflowing water WO which flows out from the inside of the case member 100, and a pipe having a predetermined diameter may be used in the same manner as the water inlet flow path member 200. The water inlet flow path member 200 and the water outlet flow path member 300 may be used by connecting a separate pipe to the case member 100, or when the case member 100 is manufactured, it is possible to configure such that the water inlet flow path member 200 and the water outlet flow path member 300 are integrally formed. As illustrated in FIGS. 2 and 3, the lower wall 120 is formed with a water inlet port 180 which is in communication with the water inlet flow path member 200, the upper wall 110 is formed with a water outlet port 190 which is in communication with the water outlet flow path member 300. That is, the incoming water WI which flows in through the water inlet port 180 is changed in direction along the flow of the storage water WS inside the case member 100 to push and move the storage water WS, and the storage water WS which is accommodated and cooled in the case member 100 is pushed out by the incoming water WI, and the storage water WS adjacent to the water outlet port 190 is changed in direction toward the water outlet port 190 and then discharged as the outflowing water WO.

The cooling member 400 which is disposed on one side of the case member 100 cools the storage water WS inside the case member 100 by performing heat exchange with the case member 100. The cooling member 400 may include a thermoelectric element 410 and a cooling block 420 to cool the storage water WS inside the case member 100. The thermoelectric element 410 is a device that performs cooling or heat generation using the Peltier Effect, in which heat generation or heat absorption occurs at the connection point of wires made of different materials when a potential value is formed in a closed circuit. For example, the thermoelectric element 410 manufactured in the form of a thin film may be applied, and when an electric signal is input, heat is absorbed at one side and heat is generated at the other side. Referring to FIG. 2, one side (left side) of the thermoelectric element 410 may be a side where heat is absorbed and the temperature decreases, and the other side (right side) may be a side where heat is generated and the temperature increases. The aforementioned cooling block 420 is cooled by an endothermic action occurring on one side of the thermoelectric element 410 to cool the case member 100. As illustrated in FIG. 2, the cooling block 420 may be formed as a multistage block. The first-stage block may be formed to cover one side of the case member 100, and the second-stage block may be formed to cover one side of the thermoelectric element 410. Accordingly, the cooling block 420 may thermally and physically connect the case member 100 and the thermoelectric element 410. The sizes of the first-stage block and the second-stage block may be made to match the sizes of the case member 100 and the thermoelectric element 410 that come into contact with each other, and with this structure, heat may be uniformly absorbed from the case member 100. Meanwhile, a heat dissipation block may be mounted on the other side of the thermoelectric element 410. This is to perform heat dissipation because when heat absorbing action occurs on one side of the thermoelectric element, heat dissipating action occurs on the other side. For example, such a heat dissipation block may be provided with a plurality of heat dissipation fins to protrude from the opposite side to which the thermoelectric element 410 is coupled, and when the heat dissipation fins are provided in this way, the contact area with external air increases, and thus, the heat dissipation effect through convective heat transfer may be increased. As described above, when the storage water WS inside the case member 100 is cooled by using the thermoelectric element 410, the generation of noise or vibration may be minimized, and the weight and size of the cooling member 400 may be reduced.

As illustrated in FIGS. 2 and 3, the case member 100 is provided with an upper wall 110 and a lower wall 120 which are disposed to be opposite to each other along a height direction Z, a pair of side walls 130, 140 which are disposed to be opposite to each other along a width direction X, a heat transfer wall 150 and an opposite wall 160 which are disposed to be opposite to each other along a depth direction Y, diaphragms 170 which are disposed to be parallel to the width direction X so as to divide the inside of the case member 100 into a plurality of zones 101, a water inlet port 180, which is in communication with the water inlet flow path member 300 such that incoming water WI flows in, and a water outlet port 190, which is in communication with the water outlet flow path member 300 such that outflowing water WO flows out. As illustrated in FIG. 2, the inside of the case member 100 may be formed with a space which is surrounded by the upper wall 110, the lower wall 120, the pair of side walls 130, 140, and the heat transfer wall 150, and this space is sealed by mounting the opposite wall 160.

In this case, any one of the water inlet port 180 and the water outlet port 190 may be disposed adjacent to the heat transfer wall 150 along the depth direction Y such that the storage water WS inside the case member 100 flows while directly contacting the inner surface of the heat transfer wall 150, and the other port may be disposed adjacent to the opposite wall 160. That is, since any one of the water inlet port 180 and the water outlet port 190 is disposed adjacent to the heat transfer wall 150 of the case member 100, the storage water WS may flow while performing heat exchange with the inner surface of the heat transfer wall 150, and thus, the cooling performance of the storage water WS may be improved. In addition, since any one port is disposed adjacent to the heat transfer wall 150 and the other port is disposed adjacent to the opposite wall 160 opposite thereto at the same time, the storage water WS flows in a diagonal direction of the case member 100, and accordingly, as the length of the flow path through which the storage water WS flows is increased, the cooling performance of the storage water WS may be improved.

Figure 4:
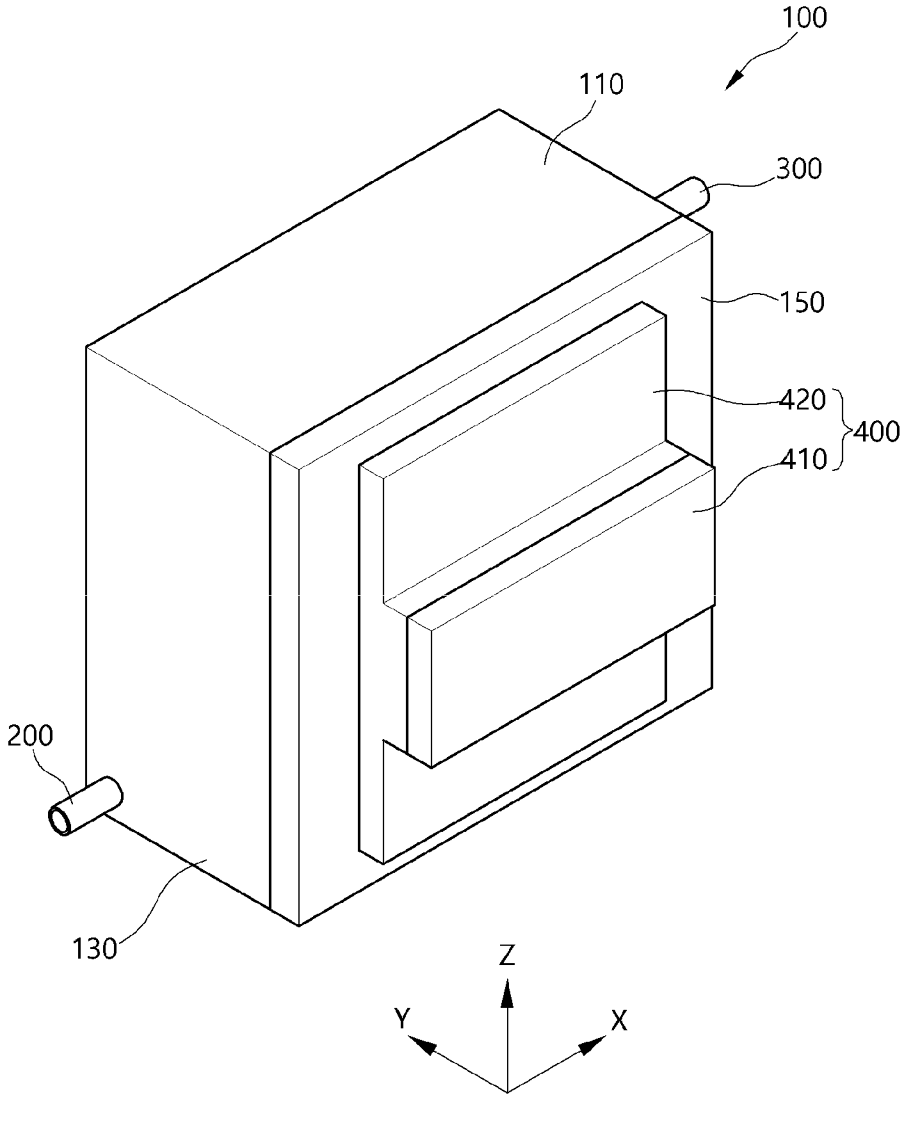
FIG. 4 is a perspective view illustrating the apparatus for making cold water according to another exemplary embodiment of the present invention.
Figure 5:
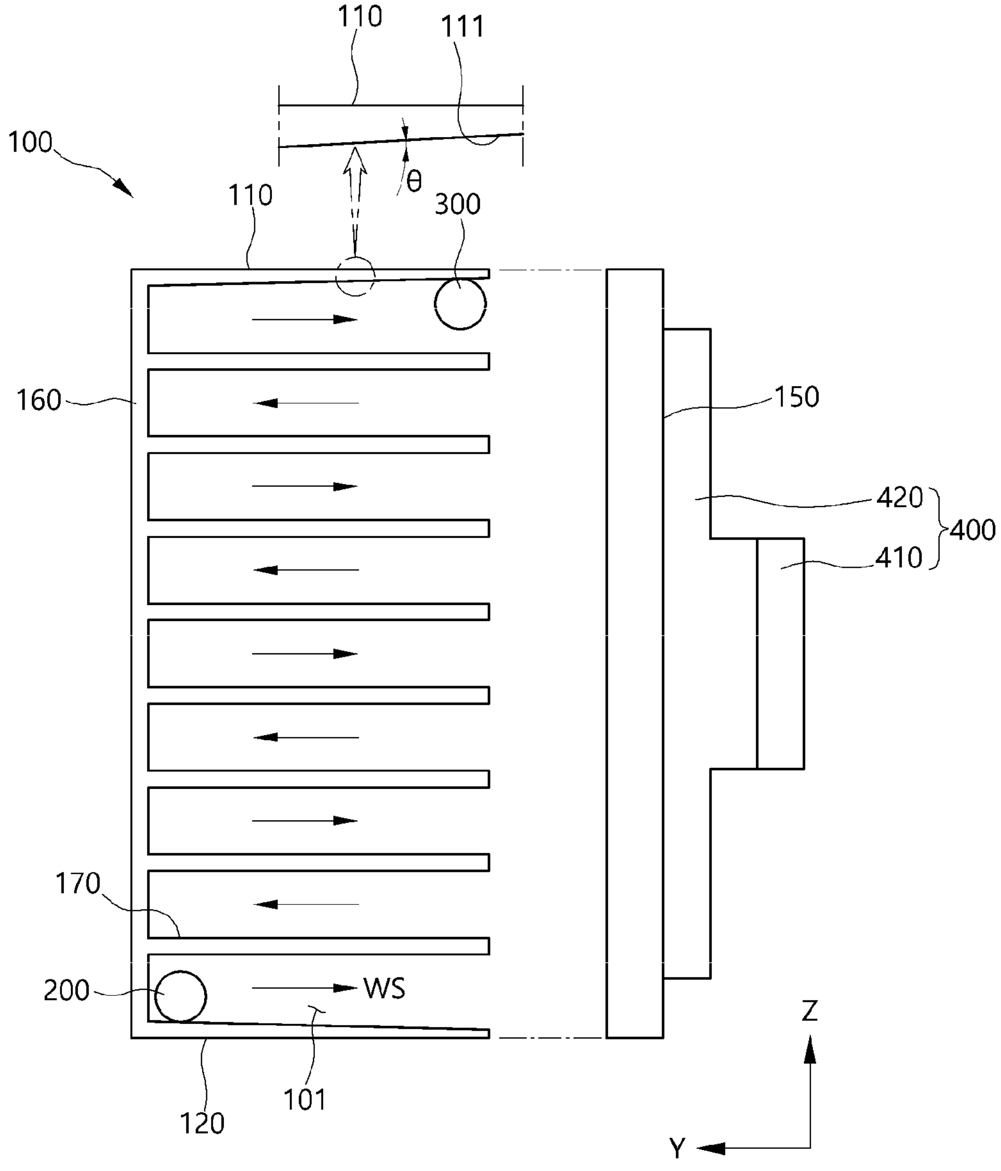
FIG. 5 is a cross-sectional view illustrating a state in which the apparatus for making cold water according to another exemplary embodiment of the present invention is cut along the depth direction.
Figure 6:
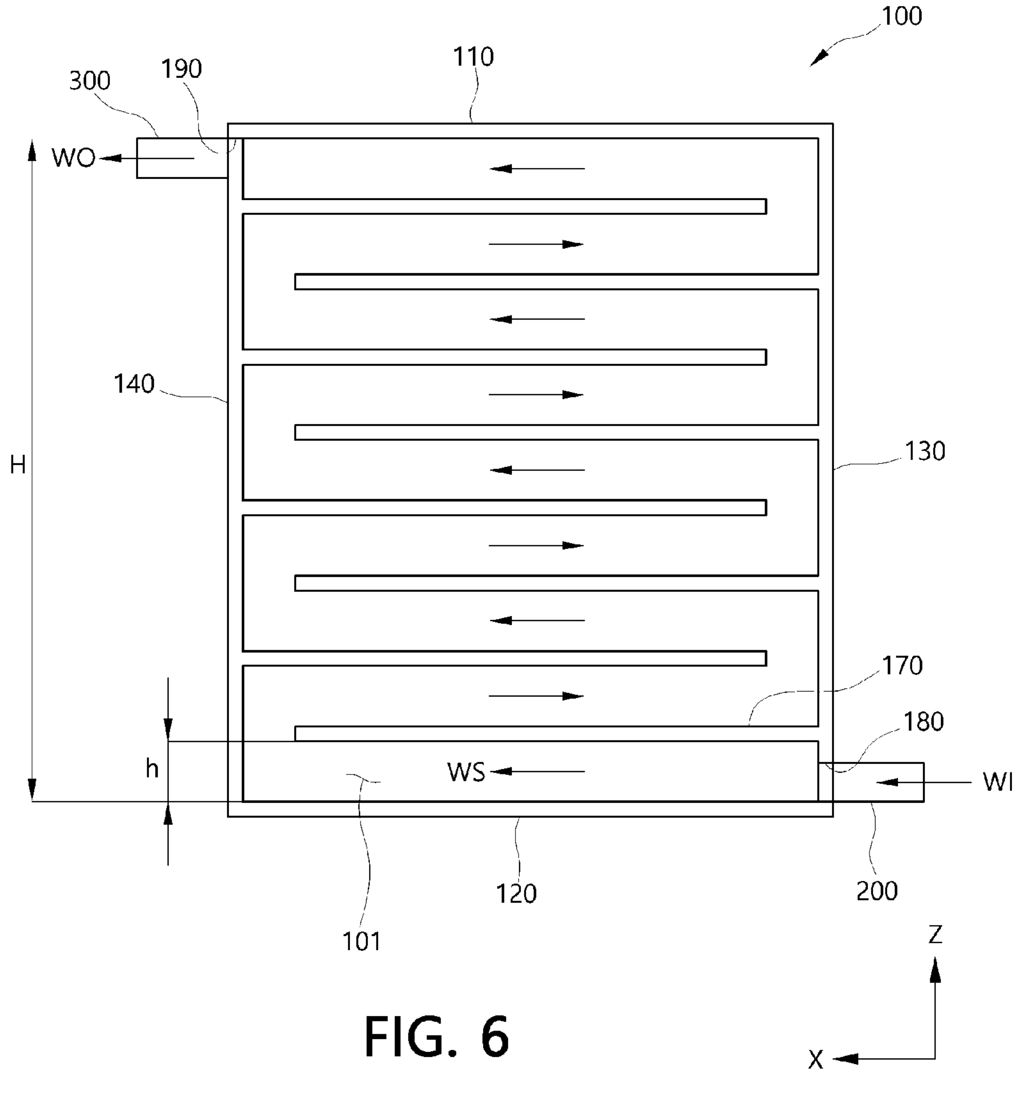
FIG. 6 is a cross-sectional view illustrating a state in which the apparatus for making cold water according to another exemplary embodiment of the present invention is cut along the width direction.

FIG. 4 is a perspective view illustrating the apparatus for making cold water according to another exemplary embodiment of the present invention, FIG. 5 is a cross-sectional view illustrating a state in which the apparatus for making cold water according to another exemplary embodiment of the present invention is cut along the depth direction, and FIG. 6 is a cross-sectional view illustrating a state in which the apparatus for making cold water according to another exemplary embodiment of the present invention is cut along the width direction.

As illustrated in FIG. 4, the apparatus for making cold water according to another exemplary embodiment of the present invention includes a water inlet flow path member 200 for providing a flow path of incoming water WI which flows into the case member 100, a water outlet flow path member 300 for providing a flow path of outflowing water WO which flows out from the inside of the case member 100, and a cooling member 400 which is disposed on one side of the case member 100 to cool the storage water WS which is accommodated inside the case member As illustrated in FIGS. 5 and 6, the case member 100 is provided with an upper wall 110 and a lower wall 120 which are disposed to be opposite to each other along a height direction Z, a pair of side walls 130, 140 which are disposed to be opposite to each other along a width direction X, a heat transfer wall 150 and an opposite wall 160 which are disposed to be opposite to each other along a depth direction Y, diaphragms 170 which are disposed to be parallel to the width direction X so as to divide the inside of the case member 100 into a plurality of zones 101, a water inlet port 180, which is in communication with the water inlet flow path member 300 such that incoming water WI flows in, and a water outlet port 190, which is in communication with the water outlet flow path member 300 such that outflowing water WO flows out. As illustrated in FIG. 5, the inside of the case member 100 is formed with a space which is surrounded by the upper wall 110, the lower wall 120, the pair of side walls 130, 140, and the opposite wall 160, and this space is sealed by mounting the heat transfer wall 150.

In this case, as described above, any one of the water inlet port 180 and the water outlet port 190 may be disposed adjacent to the heat transfer wall 150 along the depth direction Y such that the storage water WS inside the case member 100 flows while directly contacting the inner surface of the heat transfer wall 150, and the other port may be disposed adjacent to the opposite wall 160. That is, since any one of the water inlet port 180 and the water outlet port 190 is disposed adjacent to the heat transfer wall 150 of the case member 100, the storage water WS may flow while performing heat exchange with the inner surface of the heat transfer wall 150, and thus, the cooling performance of the storage water WS may be improved. In addition, since any one port is disposed adjacent to the heat transfer wall 150 and the other port is disposed adjacent to the opposite wall 160 opposite thereto at the same time, the storage water WS flows in a diagonal direction of the case member 100, and accordingly, as the length of the flow path through which the storage water WS flows is increased, the cooling performance of the storage water WS may be improved. A water inlet port 180 is provided at the lower end of any one of the pair of side walls 130, 140, and a water outlet port 190 is provided at the upper end of the other side wall. That is, since the direction of incoming water WI which flows in through the water inlet port 180 and the direction of outflowing water WO which flows out through the water outlet port 190 are formed to be parallel to the width direction X to be identical to the flow direction of storage water WS which flows through the plurality of zones 101 inside the case member, vortex generation is suppressed, and through this, the incoming water WI may smoothly push out the storage water WS, and thus, it is possible to improve the cooling performance and cleanliness.

As illustrated in FIG. 2, in the apparatus for making cold water according to an exemplary embodiment of the present invention, the diaphragms 170 may be integrally formed on the heat exchange wall 150 to extend such that the storage water WS directly contacts the inner surface of the heat exchange wall in the process of flowing between the diaphragms, and through this, it is possible to improve the cooling performance of storage water WS. As illustrated in FIG. 5, in the case of the apparatus for making cold water according to another exemplary embodiment of the present invention, the opposite wall 160 and the diaphragms 170 are integrally formed, and the heat transfer wall 150 is configured to be mounted separately, and even in this case, it is preferably to firmly mount the heat transfer wall 150 such that the heat transfer wall 150 and the diaphragms 170 can be smoothly connected thermally and physically.

As illustrated in FIG. 2, in the apparatus for making cold water according to an exemplary embodiment of the present invention, an upper wall 110, a lower wall 120 and a pair of side walls 130, 140 may be integrally formed on the heat transfer wall 150, and the opposite wall 160 may be coupled such that the inside of the case member 100 is closed, and the inner surface of the upper wall 110 may be formed with an inclined surface 111 which is formed to extend upward in a direction toward the opposite wall 160 along the depth direction Y. That is, the air inside the case member 100 is guided along an inclination θ which is formed on the inclined surface 111 along with the flow of the storage water and cannot remain inside the case member 100, and since only the storage water WS is accommodated without remaining air inside the case member 100, the cooling performance is improved. In addition, since the incoming water WI can smoothly push out the storage water WS to move, user convenience may be improved by enabling a first-in-first-out structure in which the cooled storage water WS which has flown in first flows out first. In addition, it is possible to manufacture the heat transfer wall 150 using a mold or the like such that the upper wall 110, the lower wall 120 and the pair of side walls 130, 140 are integrally formed on the heat exchange wall 150 to extend, and when it is manufactured using a mold in this way, it is important to configure the mold such that it is possible to easily remove a mold frame. As described above, when the inclined surface 111 which extends upward toward the opposite wall 160 is formed on the inner surface of the upper wall 110, a wide space is formed in a direction where the mold frame is removed such that the mold frame can be easily removed, and thus, it is possible to improve manufacturability. In this case, as illustrated in FIG. 2, if an inclined surface which extends downward toward the opposite wall 160 is also formed on the inner surface of the lower wall 120, the mold frame may be removed more easily.

In addition, as illustrated in FIG. 5, in the apparatus for making cold water according to another exemplary embodiment of the present invention, an upper wall 110, a lower wall 120 and a pair of side walls 130, 140 may integrally formed on the opposite wall, the heat transfer wall 150 may be coupled such that the inside of the case member 100 is closed, and an inclined surface 111 which extends upward in a direction toward the heat transfer wall 150 along the depth direction Y may be formed on the inner surface of the upper wall 110. That is, even in this case, the air inside the case member 100 is guided along an inclination θ which is formed on the inclined surface 111 described above along with the flow of the storage water, and it may not remain inside the case member 100, and since only the storage water WS is accommodated without residual air inside the case member 100, the cooling performance is improved. In addition, since the incoming water WI can smoothly push out the storage water WS to move, user convenience may be improved by enabling a first-in-first-out structure in which the cooled storage water WS which has flown in first flows out first. In addition, it is possible to manufacture the heat transfer wall 150 using a mold or the like such that the upper wall 110, the lower wall 120 and the pair of side walls 130, 140 are integrally formed on the heat exchange wall 150 to extend, and as described above, when the inclined surface 111 which extends upward toward the heat transfer wall 150 is formed on the inner surface of the upper wall 110, a wide space is formed in a direction where the mold frame is removed, and thus, it is possible to improve manufacturability because that the mold frame can be easily removed. In this case, as illustrated in FIG. 5, if an inclined surface which extends downward toward the heat transfer wall 150 is also formed on the inner surface of the lower wall 120, the mold frame may be removed more easily.

As illustrated in FIG. 2, in the apparatus for making cold water according to an exemplary embodiment of the present invention, the water outlet port 190 may be disposed adjacent to the opposite wall 160 such that the air guided along the inclined surface 111 is discharged together with outflowing water WO, and when configured in this way, since the air inside the case member 100 is completely discharged through the water outlet port 190, the cooling performance of the storage water WS inside the case member 100 is improved. In addition, user convenience may be improved by increasing the amount of incoming water WI and the amount of outflowing water WO flowing into the case member 100. In addition, as illustrated in FIG. 5, in the apparatus for making cold water according to another exemplary embodiment of the present invention, the water outlet port 190 may be disposed adjacent to the heat transfer wall 150 such that the air guided along the inclined surface 111 is discharged together with the outflow water WO. As described above, when configured in this way, since the air inside the case member 100 is completely discharged through the water outlet port 190, the cooling performance of the storage water WS inside the case member 100 is improved, and user convenience may be improved by increasing the amount of incoming water WI and the amount of outflowing water WO flowing into the case member 100.

Figure 7:
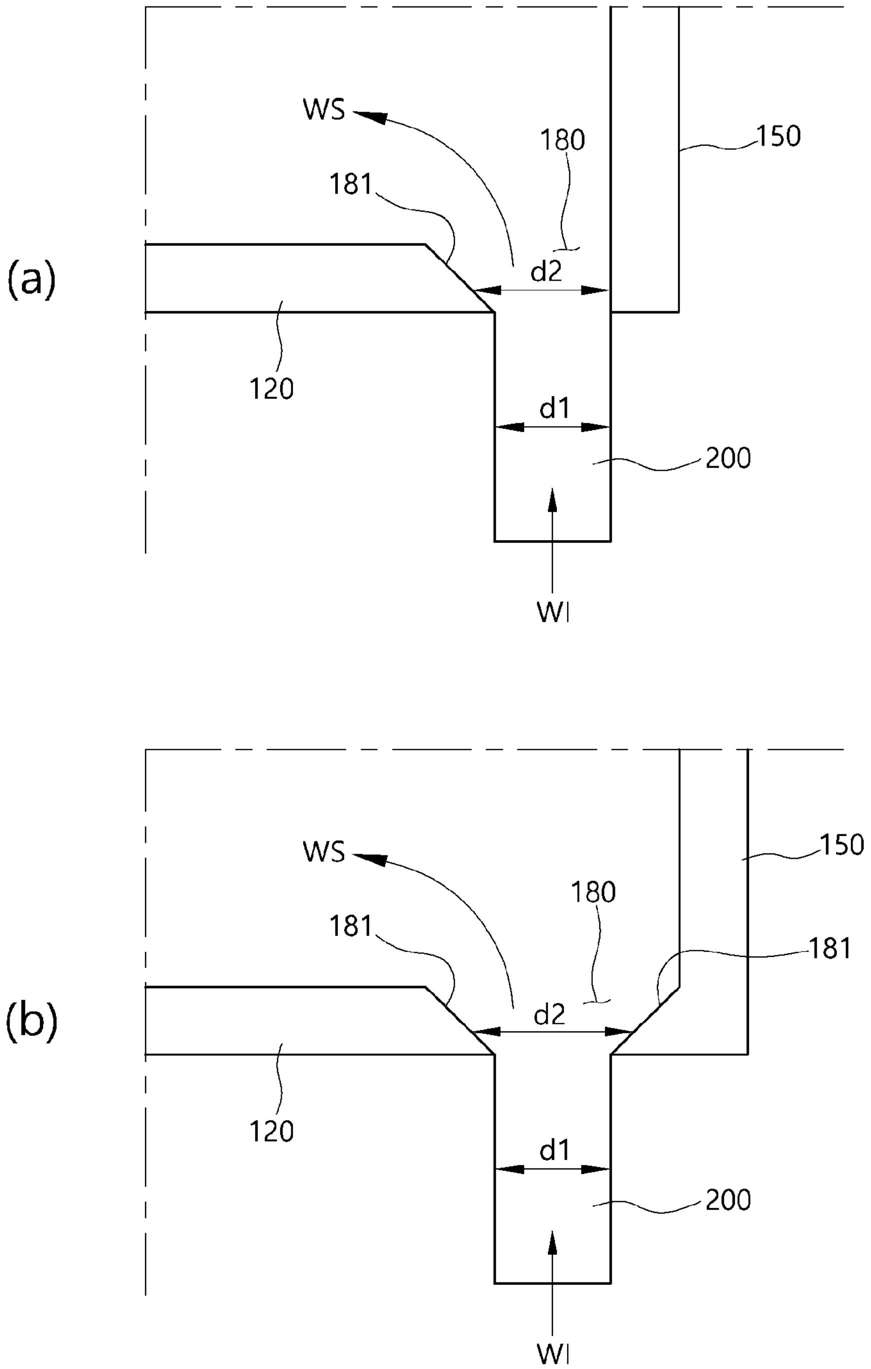
FIG. 7 is a cross-sectional view illustrating a water inlet port provided in the apparatus for making cold water according to an exemplary embodiment of the present invention.

FIG. 7 is a cross-sectional view illustrating a water inlet port provided in the apparatus for making cold water according to an exemplary embodiment of the present invention.

As illustrated in FIG. 7, in the apparatus for making cold water according to an exemplary embodiment of the present invention, the inner peripheral surface of the water inlet port 180 is characterized in that a reduction surface 181 with an expanded inner diameter is formed such that the incoming water WI flows into the case member 100 through the water inlet port 180 while the flow rate of incoming water WI which is supplied through the water inlet flow path member 200 is reduced to a certain flow rate or less. That is, the reduction surface 181 is formed in the water inlet port 180 such that the inner diameter d2 of the water inlet port 180 is formed to be larger than the inner diameter d1 of the water inlet flow path member 200, and this reduction surface 181 may be formed in the shape of an inclined surface in which the inner diameter d2 of the water inlet port 180 gradually increases. In addition, this reduction surface 181 may be formed in the shape of a stepped surface in which the inner diameter d2 of the water inlet port 180 increases. However, when the reduction surface 181 is formed in the shape of a stepped surface, it is important to configure such that a vortex is not formed in the flow of incoming water WI in the bent portion of the stepped surface. Moreover, this reduction surface 181 may be formed only on any one side of the water inlet port 180, as illustrated in FIG. 7 (*a*), or may be formed on both sides of the water inlet port 180, as illustrated in FIG. 7 (*b*). In this way, when the reduction surface 181 with an expanded inner diameter is formed on the inner peripheral surface of the water inlet port 180, the flow rate of incoming water WI which flows into the case member 100 is reduced to a certain level or below, and thus, the cooling performance is improved by enabling a first-in-first-out structure in which the incoming water WI pushes out the storage water WS.

Figure 8:
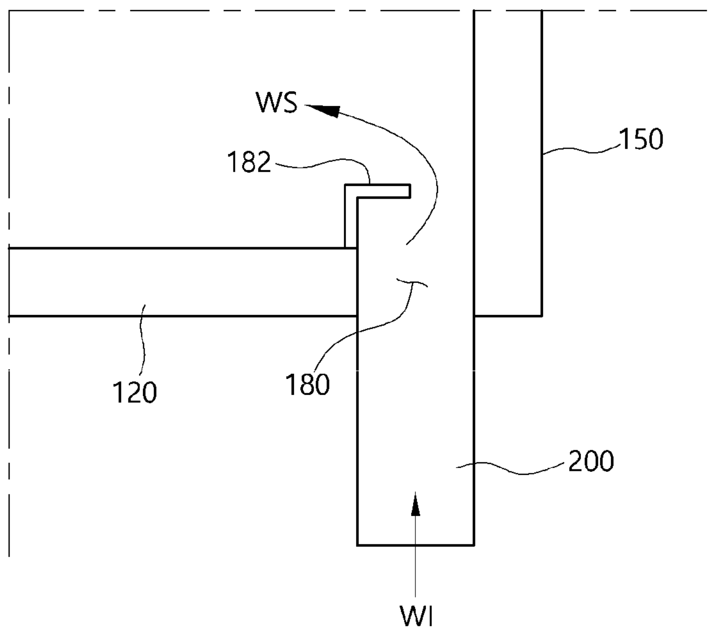
FIG. 8 is a cross-sectional view illustrating a resistance baffle provided in the apparatus for making cold water according to an exemplary embodiment of the present invention.

FIG. 8 is a cross-sectional view illustrating a resistance baffle provided in the apparatus for making cold water according to an exemplary embodiment of the present invention.

As illustrated in FIG. 8, in the apparatus for making cold water according to an exemplary embodiment of the present invention, a resistance baffle 182 that partially closes the flow path of incoming water WI to be introduced into the inside of the case member 100 may be provided while the flow rate of incoming water WI which is supplied through the water inlet flow path member 200 inside the case member 100 is reduced to a certain flow rate or less. The resistance baffle 182 is configured to partially close the flow path through which the incoming water WI which flows in through the water inlet port 180 flows, thereby reducing the flow rate of the incoming water WI flowing into the case member 100 to a certain level or below, and through this, it is possible to enable a first-in-first-out structure in which the incoming water WI pushes the storage water WS. In this case, the resistance baffle 182 may be configured to have a variable area that closes the flow path of the incoming water WI. For example, the resistance baffle 182 is fixed to the inside of the case member 100 in a hinge manner such that the area for closing the flow path of the incoming water WI varies according to the rotation angle of the resistance baffle 182. That is, the flow rate of the incoming water WI may vary depending on the product to which the apparatus for making cold water is applied, and with this configuration, even when the flow rate of the incoming water WI varies, a first-in-first-out structure may be configured by adjusting the flow rate of the incoming water WI which flows into the case member 100 by changing the area that closes the flow path of the incoming water WI through the rotational operation of the resistance baffle 182.

In this case, in the apparatus for making cold water according to an exemplary embodiment of the present invention, the flow rate of the storage water WS flowing along the plurality of regions 101 inside the case member 100 may be formed to be 1.2 L/min or less, and through this, the cooling performance is improved by enabling a first-in-first-out structure in which the incoming water WI pushes out the storage water WS.

In addition, as illustrated in FIG. 3, in the apparatus for making cold water according to an exemplary embodiment of the present invention, when the total height inside the case member 100 is H, the interval h between the diaphragms 170 which are disposed to be opposite to each other may be formed to be H/9 or less, and for example, the interval between the diaphragms 170 which are disposed to be opposite to each other may be formed to be 18 mm or less. Alternatively, as illustrated in FIG. 6, even in the case of the apparatus for making cold water according to another exemplary embodiment of the present invention, when the total height inside the case member 100 is H, the interval h between the diaphragms 170 which are disposed to be opposite to each other may be formed to be H/9 or less, and for example, the interval between the diaphragms 170 which are disposed to be opposite to each other may be formed to be 18 mm or less. With this configuration, the cooling performance is improved by enabling a first-in-first-out structure in which the incoming water WI pushes out the storage water WS.

Figure 9:
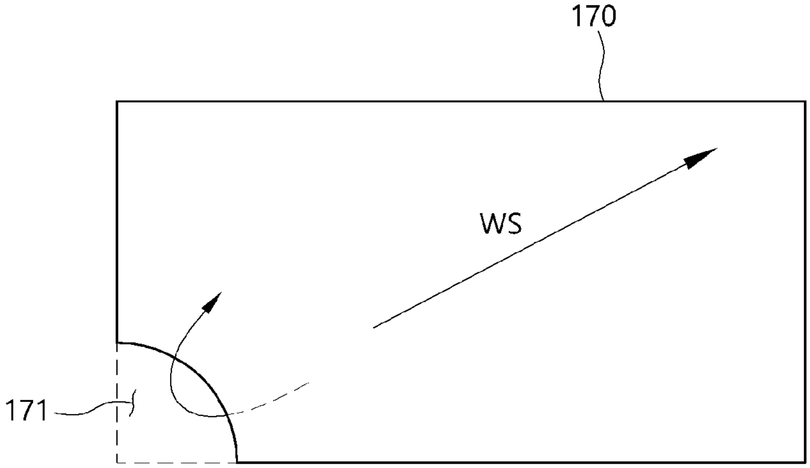
FIG. 9 is a plan view illustrating diaphragms provided in the apparatus for making cold water according to an exemplary embodiment of the present invention.
Figure 9:
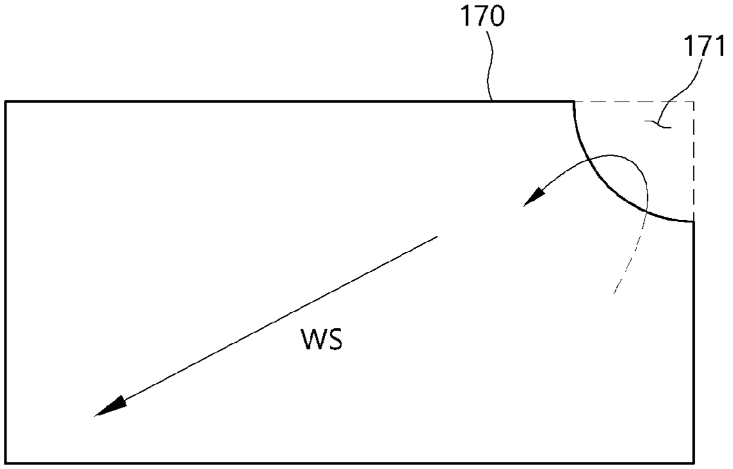
Figure 10:
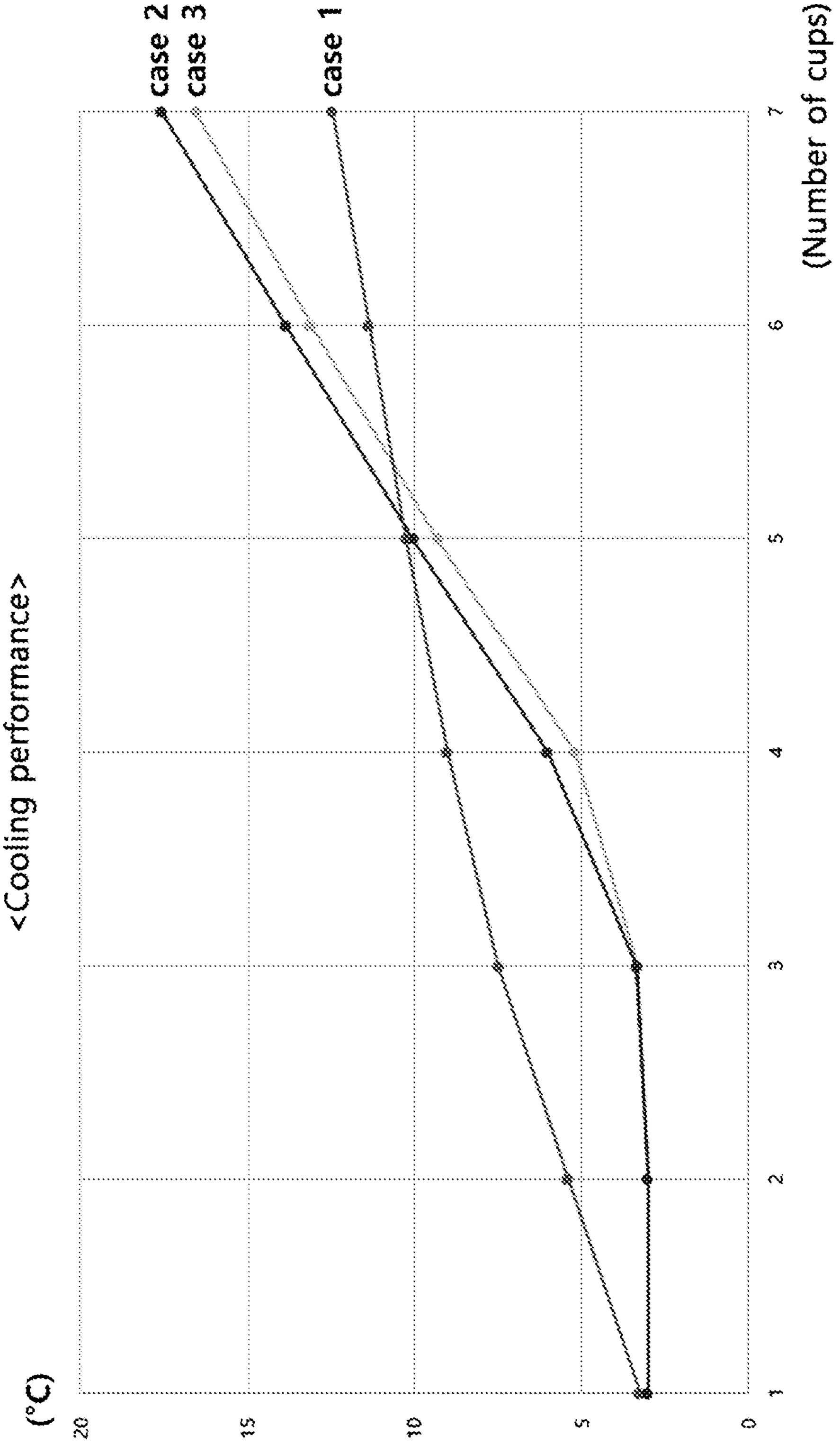
FIG. 10 is a graph showing changes in temperature according to the number of outflowing water cups in order to compare the cooling effects of the apparatus for making cold water according to an exemplary embodiment of the present invention and water purifiers according to the related art.

FIG. 9 is a plan view illustrating diaphragms provided in the apparatus for making cold water according to an exemplary embodiment of the present invention, and FIG. 10 is a graph showing changes in temperature according to the number of outflowing water cups in order to compare the cooling effects of the apparatus for making cold water according to an exemplary embodiment of the present invention and water purifiers according to the related art.

As illustrated in FIG. 9, in the apparatus for making cold water according to an exemplary embodiment of the present invention, openings 171 through which the storage water WS moves are formed in the diaphragm 170, respectively, and these openings 171 are characterized in that the openings are alternately formed at the corners and opposite corners of the diaphragms 170 which are continuously arranged upward such that the storage water WS flowing inside the case member 100 flows in a diagonal direction. That is, when the incoming water WI flows into a position adjacent to the heat transfer wall 150, as shown in FIG. 2, the storage water WS moves along the depth direction Y to move away from the heat transfer wall 150 due to the incoming water WI, and at the same time, as illustrated in FIG. 3, since it moves along the width direction X from one side wall 130 to the other side wall 140, it is possible to enable the diagonal flow of the storage water WS. Alternatively, when the incoming water WI flows into a position adjacent to the opposite wall 160, as illustrated in FIG. 5, the storage water WS moves away from the opposite wall 160 along the depth direction Y due to the incoming water WI, and at the same time, as illustrated in FIG. 6, since it moves along the width direction X from one side wall 130 to the other side wall 140, it is possible to enable the diagonal flow of the storage water WS. In this way, when the storage water WS is configured to flow in the diagonal direction, the length of the flow path through which the storage water WS flows is increased, and thus, it is possible to improve the cooling performance of the storage water WS.

FIG. 10 is a graph showing the temperature change according to the number of outflowing water cups in order to compare the cooling effects of the apparatus for making cold water according to an exemplary embodiment of the present invention and water purifiers according to the related art. In case 1, as in the related art, it is a configuration in which water is received from the upper side of the tank body and then discharged to the lower side as it cools, and a check valve for air discharge is provided on the upper part of the tank body for air discharge. In case 2, it is a configuration in which after the incoming water WI is received from the lower side of the case member 100, it is cooled and discharged upward, and openings are formed at one side and the other side of the diaphragms 170 which are continuously arranged upward such that the storage water WS moves along the width direction X. In case 3, it is a configuration in which after the incoming water WI is received from the lower side of the case member 100, it is cooled and discharged upward, and openings 171 are formed at corners and opposite corners of the diaphragms 170 which are continuously arranged upward such that the storage water WS moves in a diagonal direction. For each of these cases, it was confirmed that approximately 5 cups of cold water below 10° C. can be dispensed when cold water was continuously dispensed. All cases were similar in that the temperature of the first cup was approximately 4° C., but from the second cup and the third cup, it can be confirmed that cases 2 and 3 had more excellent cooling performance than case 1, which is a case of the related art. Furthermore, in the case of the fourth and fifth cups, it can be seen that case 3 had more excellent cooling performance than case 2. Therefore, as in case 3, when it is configured such that the incoming water WI is received from the lower side, the cooled outflowing water WO is discharged to the upper side, and openings 171 are formed at corners and opposite corners of the diaphragms 170 which are continuously arranged upward such that the storage water WS moves in a diagonal direction, it is possible to secure excellent cooling performance.

Figure 11:
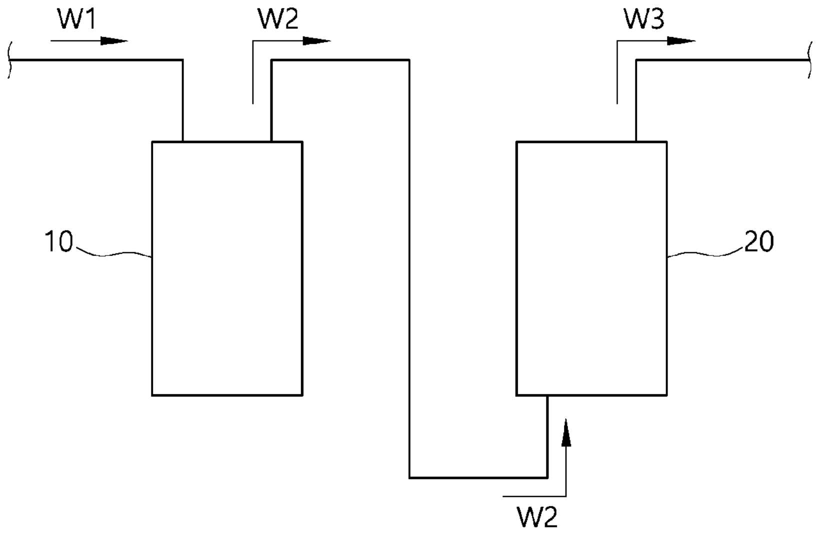
FIG. 11 is a block diagram of the water purifier according to an exemplary embodiment of the present invention.

FIG. 11 is a block diagram of the water purifier according to an exemplary embodiment of the present invention.

As illustrated in FIG. 11, the water purifier according to the present invention may include a filtering unit 10 for filtering raw water W1 to generate purified water W2, and a cold water generating unit 20 for generating cold water W3 by receiving purified water W2 from the filtering unit 10. The filtering unit 10 receives raw water W1 from the outside and then filters the raw water W1 to generate purified water W2. The filtering unit 10 may include several filters. For example, the filtering unit 10 may include a pre-carbon filter, a membrane filter and an after-carbon filter. In addition, the filtering unit 10 may include an electric deionization-type filter. The electrodeionization method refer to electrodeionization (EDI), continuous electrodeionization (CEDI), capacitive deionization (CDI) and the like. The purified water W2 generated by the filtering unit 10 may be directly supplied to the cold water generating unit 20, or it is possible to be configured such that it may be supplied to a separate storage unit for storing the purified water W2, and the cold water generating unit 20 is supplied with the purified water W2 through a separate storage unit.

The cold water generating unit 20 may be provided with a case member 100 in which purified water W2 is accommodated, a water inlet flow path member 200 for providing a flow path through which purified water W2 flows into the case member 100, a water outlet flow path member 300 for providing a flow path through which purified water W2 which is cooled inside the case member 100 flows out, and a cooling member 400 which is disposed on one side of the case member 100 to cool the purified water W2 which is accommodated inside the case member 100. As described above, the case member 100 provides a space for accommodating the purified water W2, and for the water inlet flow path member 200 or the water outlet flow path member 300, a pipe having a predetermined diameter such that the purified water W2 flows in or out may be used. The water inlet flow path member 200 and the water outlet flow path member 300 may be used by connecting a separate pipe to the case member 100, or when the case member 100 is manufactured, it is possible to configure the water inlet flow path member 200 and the water outlet flow path member 300 to be integrally formed. A cooling member 400 for cooling the purified water W2 may be provided on one side of the case member 100, and the cooling member 400 may be provided with a thermoelectric element 410 and a cooling block 420 as described above.

The case member 100 may be provided with an upper wall 110 and a lower wall 120 which are disposed to be opposite to each other along a height direction Z, a pair of side walls 130, 140 which are disposed to be opposite to each other along a width direction X, a heat transfer wall 150 and an opposite wall 160 which are disposed to be opposite to each other along a depth direction Y, diaphragms 170 which are disposed to be parallel to the width direction X so as to divide the inside of the case member into a plurality of zones 101, and a water inlet port 180, which is in communication with the water inlet flow path member 200 such that purified water W2 flows in, and a water outlet port 190, which is in communication with the water outlet flow path member 300 such that purified water W2 flows out, and wherein any one of the water inlet port 180 and the water outlet port 190 may be disposed adjacent to the heat transfer wall 150 along the depth direction Y such that the purified water W2 inside the case member 100 flows while directing contacting the inner surface of the heat transfer wall 150, and the other port is disposed adjacent to the opposite wall 160.

That is, since any one of the water inlet port 180 and the water outlet port 190 is disposed adjacent to the heat transfer wall 150 of the case member 100, the purified water W2 may flow while performing heat exchange with the inner surface of the heat transfer wall 150, and thus, it is possible to improve the cooling performance of the purified water W2. In addition, since the purified water W2 does not remain inside the case member 100 and can flow smoothly, it is possible to improve the cleanliness of the purified water W2. In addition, since any one port is disposed adjacent to the heat transfer wall 150 and the other port is disposed adjacent to the opposite wall 160 opposite thereto at the same time, the purified water W2 flows in the diagonal direction of the case member 100, and accordingly, as the length of the flow path through which the purified water W2 flows is increased, the cooling performance of the purified water W2 may be improved.

Although the exemplary embodiments of the present invention have been described, the spirit of the present invention is not limited to the exemplary embodiments set forth herein. Those of ordinary skill in the art who understand the spirit of the present invention may easily propose other exemplary embodiments by modifying, changing, deleting or adding elements within the same spirit, but this will also be said to fall within the scope of the present invention.

The invention claimed is:

1. An apparatus for making cold water, comprising:

a case member in which storage water is accommodated;

a water inlet flow path member for providing a flow path of incoming water which flows into the case member;

a water outlet flow path member for providing a flow path of outflowing water which flows out from an inside of the case member; and a cooling member which is disposed on one side of the case member to cool the storage water which is accommodated inside the case member, wherein the case member is provided with an upper wall and a lower wall which are disposed to be opposite to each other along a height direction, a pair of side walls which are disposed to be opposite to each other along a width direction, a heat transfer wall and an opposite wall which are disposed to be opposite to each other along a depth direction, diaphragms which are disposed to be parallel to the width direction so as to divide the inside of the case member into a plurality of zones, a water inlet port, which is in communication with the water inlet flow path member such that the incoming water flows in, and a water outlet port, which is in communication with the water outlet flow path member such that the outflowing water flows out, wherein the upper wall, the lower wall and the pair of side walls are integrally formed with the heat transfer wall, wherein in the heat transfer wall, the diaphragms are formed to integrally extend such that the storage water directly contacts an inner surface of the heat transfer wall in the process of flowing between the diaphragms, wherein the opposite wall is coupled such that the inside of the case member is closed, wherein an inclined surface which extends upward in a direction toward the opposite wall along the depth direction is formed on an inner surface of the upper wall, wherein an inclined surface which extends downward in a direction toward the opposite wall along the depth direction is formed on an inner surface of the lower wall, and wherein any one of the water inlet port and the water outlet port is disposed adjacent to the heat transfer wall along the depth direction such that the storage water inside the case member flows while directly contacting the inner surface of the heat transfer wall, and the other port is disposed adjacent to the opposite wall.

2. The apparatus of claim 1, wherein the water inlet port is provided at a lower end of any one of the pair of side walls, and the water outlet port is provided at an upper end of the other side wall, and wherein a direction of the incoming water which flows in through the water inlet port and a direction of the outflowing water which flows out through the water outlet port are formed to be parallel to the width direction.

3. The apparatus of claim 1, wherein the water outlet port is disposed adjacent to the opposite wall such that air guided along the inclined surface is discharged together with the outflowing water.

4. The apparatus of claim 1, wherein a reduction surface is formed on an inner peripheral surface of the water inlet port such that an inner diameter is expanded so that while a flow rate of the incoming water which is supplied through the water inlet flow path member is reduced to a certain flow rate or less, the incoming water flows into the inside of the case member through the water inlet port.

5. The apparatus of claim 1, wherein a resistance baffle is provided inside the case member to partially close the flow path of incoming water such that while a flow rate of the incoming water which is supplied through the water inlet flow path member is reduced to a certain flow rate or less, the incoming water flows into the inside of the case member.

6. The apparatus of claim 4, wherein the flow rate of the storage water which flows along the plurality of zones inside the case member is 1.2 L/min or less.

7. The apparatus of claim 1, wherein when a total height inside the case member is H, an interval h between the diaphragms which are disposed to be opposite to each other is H/9 or less.

8. The apparatus of claim 7, wherein the interval between the diaphragms which are disposed to be opposite to each other is 18 mm or less.

9. The apparatus of claim 1, wherein openings through which the storage water moves are formed in the diaphragms, respectively, and wherein the openings are alternately formed at corners and opposite corners of the diaphragms that are continuously arranged upward such that the storage water which flows inside the case member flows in a diagonal direction.

* * * * *